June 13, 1967     J. H. BRENNEMAN     3,325,585
COMBINED PANEL FASTENER AND ELECTRICAL CONDUIT
Original Filed Sept. 1, 1959     7 Sheets-Sheet 1

INVENTOR
JOHN H. BRENNEMAN
BY
ATTORNEYS

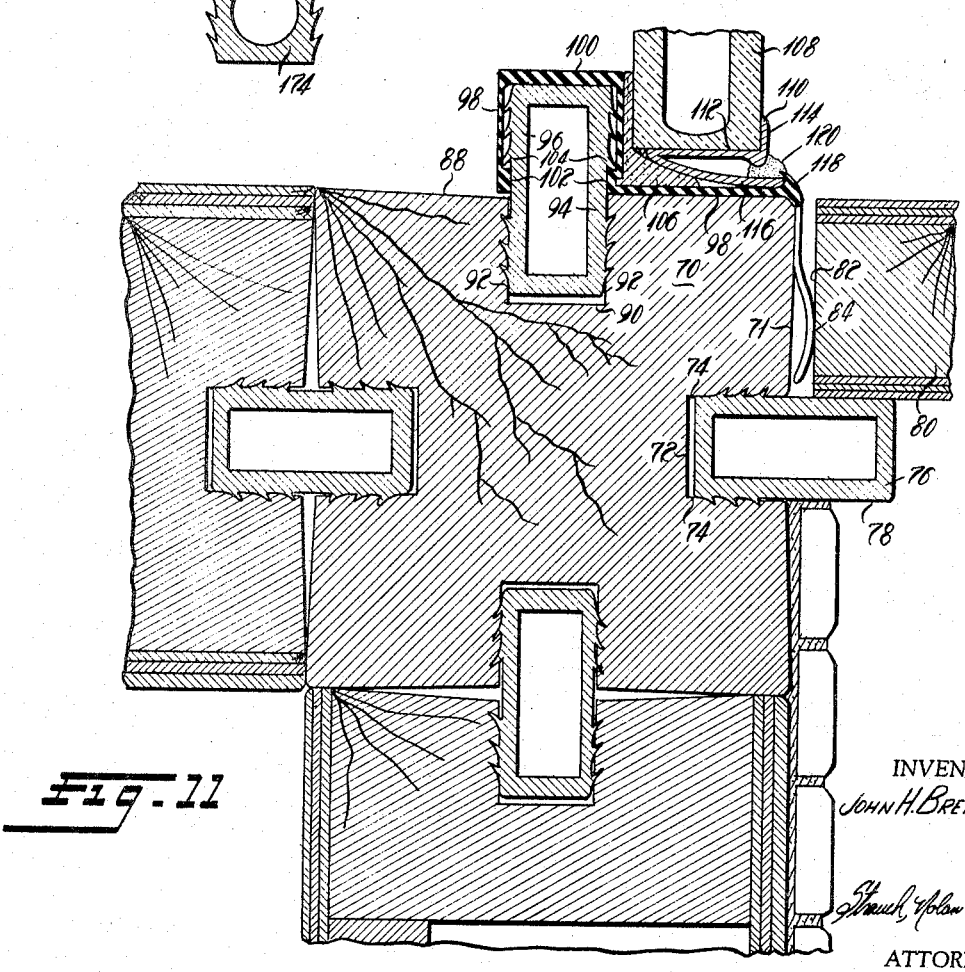

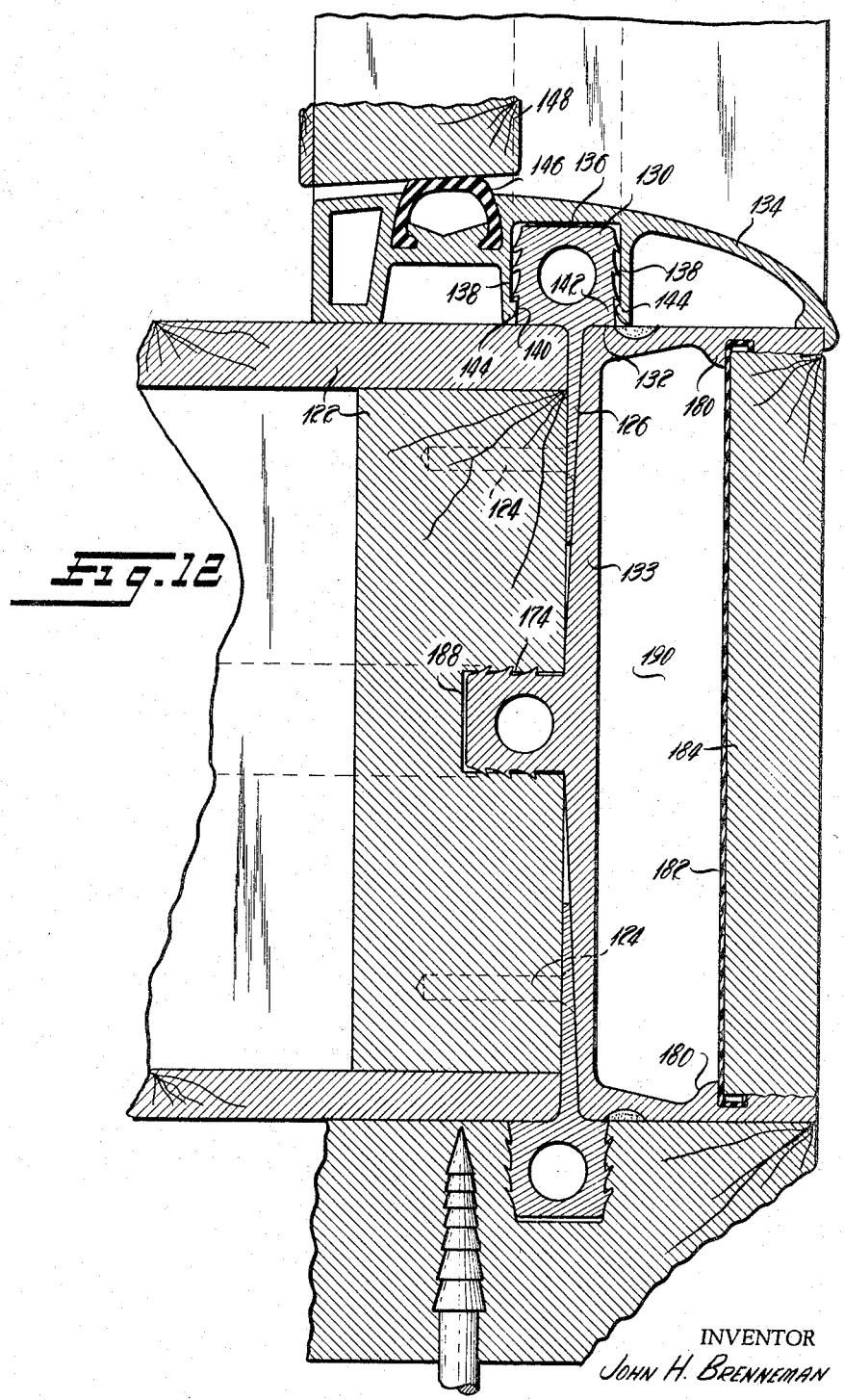

INVENTOR
JOHN H. BRENNEMAN
BY Strauch, Nolan & Neale
ATTORNEYS

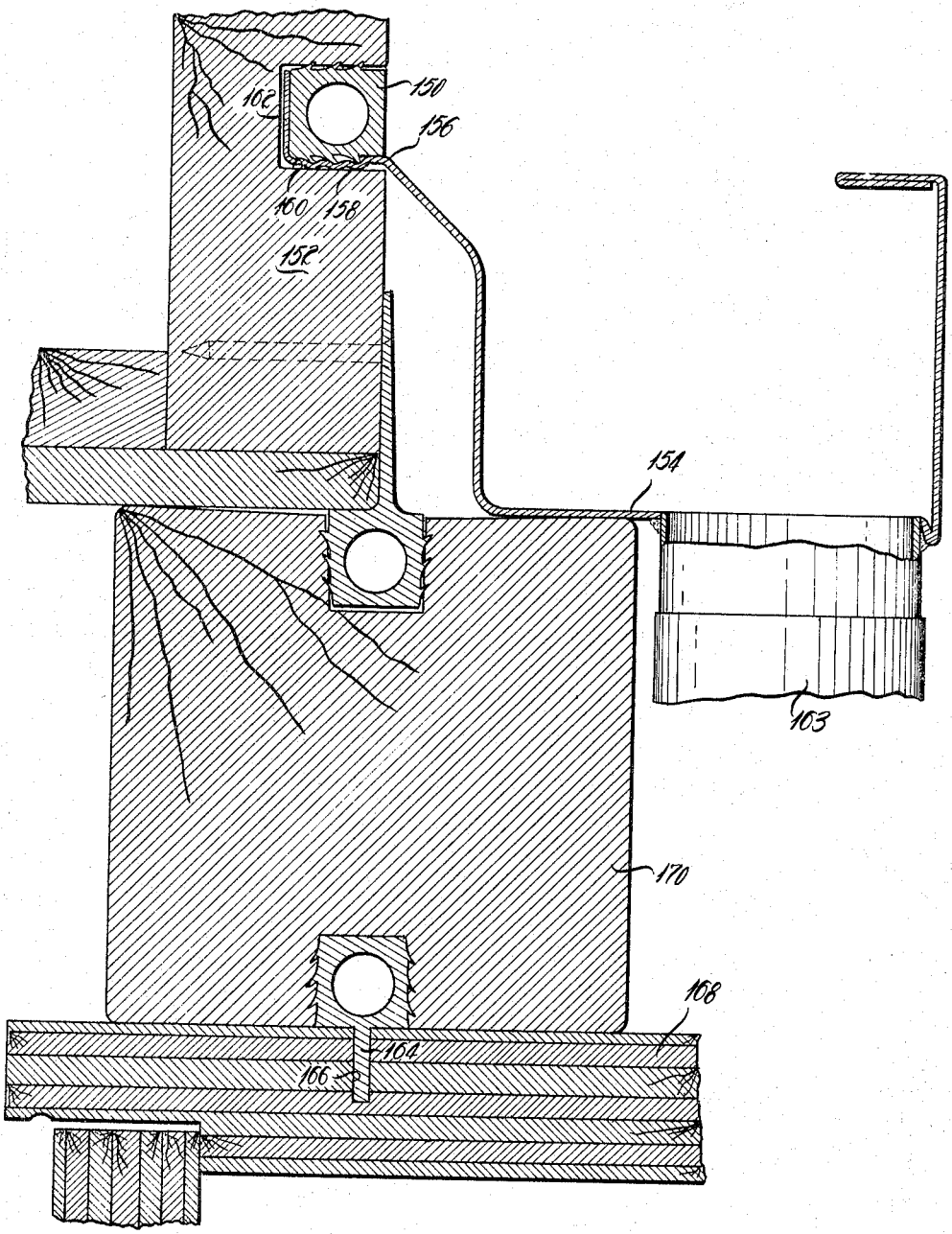

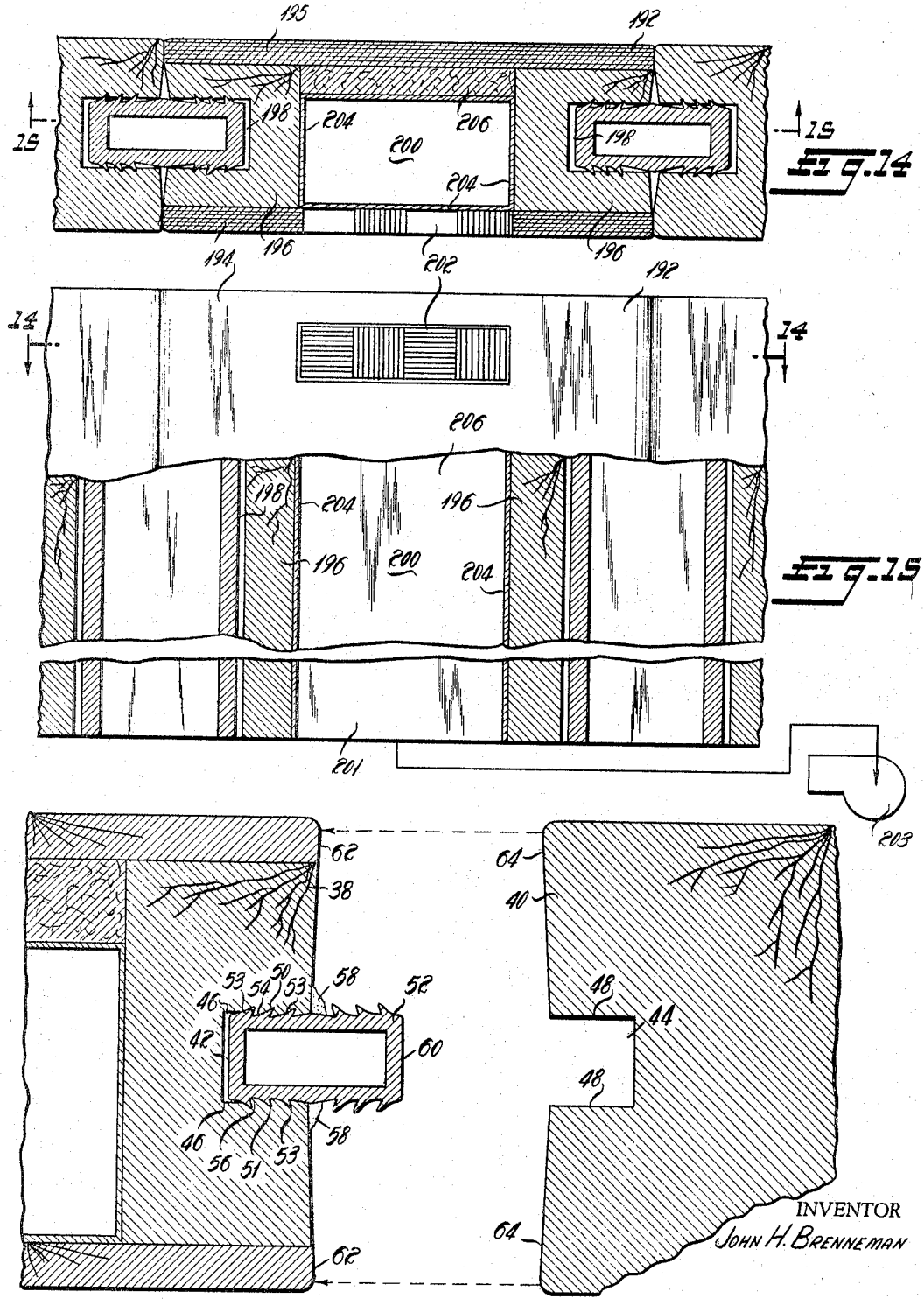

June 13, 1967      J. H. BRENNEMAN      3,325,585
COMBINED PANEL FASTENER AND ELECTRICAL CONDUIT
Original Filed Sept. 1, 1959      7 Sheets-Sheet 7

INVENTOR
JOHN H. BRENNEMAN

BY *Strauch, Nolan, Neale Nies and Bronaugh*

ATTORNEY

United States Patent Office 3,325,585
Patented June 13, 1967

3,325,585
COMBINED PANEL FASTENER AND
ELECTRICAL CONDUIT
John H. Brenneman, 6 Queenston Place,
Princeton, N.J. 08540
Continuation of application Ser. No. 837,495, Sept. 1,
1959. This application Mar. 15, 1966, Ser. No. 534,533
11 Claims. (Cl. 174—48)

This is a continuation of application Ser. No. 837,495, filed Sept. 1, 1959, now abandoned.

This invention relates to a new system of panel construction for buildings, such as residential houses, fences and the like, and more particularly to novel spline fasteners and to novel prefabricated panels which are adapted to be installed with a minimum of on-site labor.

Splines have been used for many years in the building trades as tools of alignment, their most notable use being as inserts in glued joints or in ceiling or roof panels to preclude the sagging or uneven deflection of the structural materials used. Usually, however, it has been considered necessary to use a device or material other than the spline for fastening purposes. For example, nails and/or glue are commonly used to join interior wall or ceiling panels though, in such cases, it has usually been necessary to leave one side of the panels unfinished so that the nailing or gluing operation might be properly performed. In those cases where the panels have been completely prefabricated during manufacture, it has been necessary to use some external fastener device such as a batten or nails to join them and to finish over any nail holes and other exposed fasteners.

All construction methods devised to date using prefabricated wooden panels have necessitated substantial on-site labor for the construction of a given unit, even where small or light buildings are involved. In addition to the added cost in high priced labor areas, such methods have required the use of cumbersome and time-consuming construction methods, such as drilling, gluing, hammering, driving screws, etc., all of which tend to injure the materials of construction to a greater or lesser degree and/or require additional finishing operations.

Furthermore, the wiring techniques associated with prefabricated panel construction methods involve substantial labor, time and cost and often result in structural damage due to the necessity for cutting pre-installed structural parts. Also, unless suitable precautions are taken, such as the installation of conduits and the like, conventional wiring presents a fire hazard.

Air heating and cooling systems required by prior prefabricated panel building techniques have also presented a source of difficulty. For example, such systems often require the use of circuitous and involved duct-work and the installation of conventional heating ducts involves extensive cutting of framing and hand-fitting of sheet metal and extra wall space.

It is accordingly the primary object of the present invention to provide a structural fastening device making possible the erection of a building or other structure using completely finished panel components for the floors, walls, ceilings and roofs which may be factory finished according to builder specifications and requiring a minimum of nails and carpentry work.

It is a further object of the present invention to provide a structural fastening device making possible the erection of a building or other structure having no face nailing and requiring as tools of construction only a rubber mallet, pounding blocks, a hammer and nails for blind-nailing and hack saw.

It is still another object of the present invention to provide a spline fastening device having teeth which serves not only to fasten two wall panels or other structural units together, but which functions additionally as a positive, interlocking weatherstripping or sealing connection extending from floor to ceiling, as an electrical conduit and as a trim section.

A further object of the present invention is to provide a spline fastening device making possible the use of prefabricated, sealed wall, ceiling and/or floor plywood panel units which obviate the need for conventional air conditioning ducts and which are more efficient than prior art air conditioning systems.

It is still another object of the present invention to provide a spline fastening device which makes possible the elimination of the special cutting and fitting involved when different structural forms are joined and which permits the separation of the mechanical units into smaller, simpler parts.

It is yet another object of the present invention to provide a spline fastening device having a built-in electrical conduit which serves to adequately protect against the fire hazards of electrical wiring and which is so constructed as to permit the addition to or elimination of wiring from the structure after it has been installed without requiring a substantial amount of labor, time or cost by eliminating the need to damage or cut the existing structure.

A still further object of the present invention is to provide a novel roof truss structure which is sturdy, weatherproof and which may be simply constructed by unskilled labor.

Additional objects and advantages will become apparent as the description proceeds in connection with the accompanying drawings in which:

FIGURES 5–10 are transverse sectional views of other modifications of the basic spline fastening device of the present invention;

FIGURE 11 is a transverse sectional view showing the application of several of the fastening devices of the instant invention to a variety of fastening and securing uses, including the fastening together of panels to a support post, use as a door trim section and the supporting and securing of a window trim section;

FIGURE 12 is a transverse sectional view through a floor structure showing the use of several of the novel fastening devices of the instant invention as (1) an electrical sill-box and (2) as means for securing a threshold structure;

FIGURE 13 is a sectional view of a portion of a building structure showing additional applications of several of the fastening devices of the instant invention, including the fastening of a rain gutter to the side of a building;

FIGURE 14 is a transverse section taken along lines 14—14 of FIGURE 15 and showing a prefabricated wall panel secured to adjacent structural units by means of the novel spline fastening devices of the instant invention and being adapted for use as a heat conduit;

FIGURE 15 is a front elevation of the panel structure shown in FIGURE 14, having a portion of its internal structure shown in section along the lines 15—15 of FIGURE 14 and schematically showing the cooperation between the panel and a blower forming part of an air conditioning system;

FIGURE 16 is a transverse sectional view showing the method of assembly of two structural units using the novel spline fastening device of the present invention;

Figure 2:
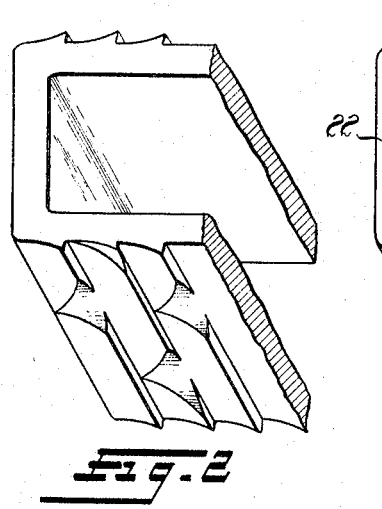
FIGURE 1–4 are pictorial views of several embodiments of the novel spline fastening device of the persent invention.

The basic spline fastening device of the instant invention may best be described by reference to FIGURE 1 of the drawings. As there shown, the spline fastener comprises an elongated, hollow, generally rectangular element 20 having two planar sides 22 and two toothed sides 24. Each of sides 24 is longitudinally divided into two substantially equal portions 26 and 28, each of which has continuous, longitudinally oriented rows of teeth 30 all of whose leading faces 32 slope upwardly toward the longitudinal center of sides 24. Trailing faces 34 of each of said teeth form an acute angle with said leading faces 32 to provide a relatively sharp biting edge 36 on each of the teeth.

Figure 1:
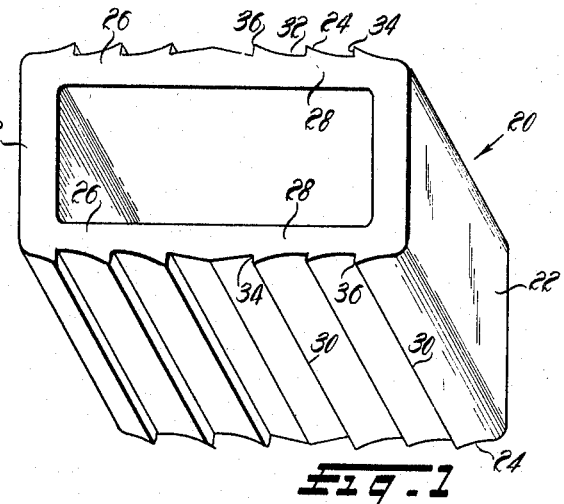

Thus, as can be clearly seen in FIGURE 1, the sides 24 and portions 26 and 28 of each side are respectively mirror images of one another. While the spline fastener is constructed of aluminum in its preferred form, any rigid material having sound structural characteristics may be employed with similar effectiveness.

The use of a spline fastener as described above may best be shown by reference to FIGURE 16, in which a wall panel and support post are shown fastened together in edge-to-edge abutting relationship. Wall panel 38 and post 40 are provided with longitudinal slots 42 and 44 in their respective abutting edges. The side walls 46 and 48 of the respective slots are substantially parallel to and separated from one another by a distance which is slightly less than the distance between the biting edges 50 and 51 of the corresponding teeth 53 on opposite sides of spline fastener 52 but slightly greater than the distance separating the corresponding valleys 54 separating adjacent teeth on one side from the base of the valleys 56 on the opposite side of the spline fastener.

As will be apparent from FIGURE 16, when spline fastener 52 is forced into slot 42 (as by means of a rubber mallet or the like), teeth 53 will, as they bite into the side walls of the slot, displace the wood of said side walls into the valleys between the teeth, thus increasing the holding capacity of the spline fastener.

To secure panel 38 to post 40, the exposed end 60 of spline fastener 52 is forced into slot 44 as by means of a pounding block (not shown) or like tool. Panel 38 and post 40 are forced together until their edges 62 and 64, respectively, abut, at which point they will be tightly secured relative to one another by means of the spline fastener. As is shown in FIGURE 16, the abutting edges 62 and 64 of panel 38 and post 40 may be concave to improve the fit of the panels one against the other and, correspondingly, to improve the locking action of the spline fastener.

Though the spline fasteners of the instant invention may be used in short sections if desired since two inch lengths will support a force of over 100 pounds, one novel feature of the instant invention resides in making the spline fasteners substantially co-extensive with the slots provided in the edges of the structural members into which the fastener is to be inserted. Such a provision results in a structure providing a positive, interlocking weatherstripping connection without the need of additional weatherstripping connections. A more effective weather seal may be provided, if desired, by the additional application of caulking or a gasket at the intersection of the spline fastener with the outer edges of the slots in the structural units, as shown by the numeral 58 in FIGURE 16.

The spline fastener shown in FIGURE 1 has teeth each of whose leading faces 32 is continuous and concave or hollow-ground. This configuration provides a basic section which is almost universally adaptable to varying requirements and which is relatively easy and economical to produce. It is, accordingly, the preferred structure. Depending upon the intended use, however, the design of the spline fastener may be varied as shown in the drawings.

For example, the structure of FIGURE 2 has concave or hollow-ground, intermittent teeth in which alternating notches gouged in the teeth provide sharper punching power for use with wooden structural elements having very pronounced hard and soft annual rings, such as Douglas Fir.

Figure 3:
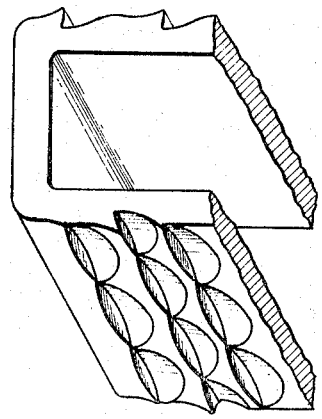

FIGURE 3 shows a spline fastener having a series of rows of intermittent, burr-like teeth having outstanding punching ability with respect to tough or variable hardness wood and plastic structural units. Such a section could be extruded with flat sides and the teeth could then be cut in a separate operation by means of a gouge-like cutter adapted to raise extremely sharp-edged burrs.

Figure 4:
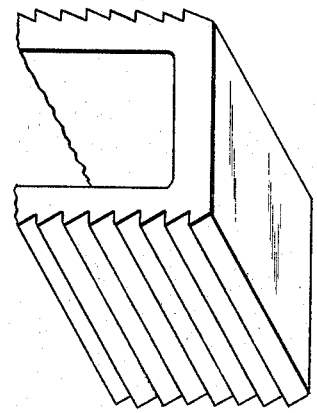

The spline fastener shown in FIGURE 4 is provided with continuous, straight-beveled teeth. This section is similar to that shown in FIGURE 1 except that its teeth are more closely spaced than those in FIGURE 1 and have flat rather than concave or hollow-ground leading faces. As in the case of the structure shown in FIGURE 1, this structure is generally universally adaptable to various requirements and, because of its additional biting surfaces, has an especially strong gripping action.

Figure 5:
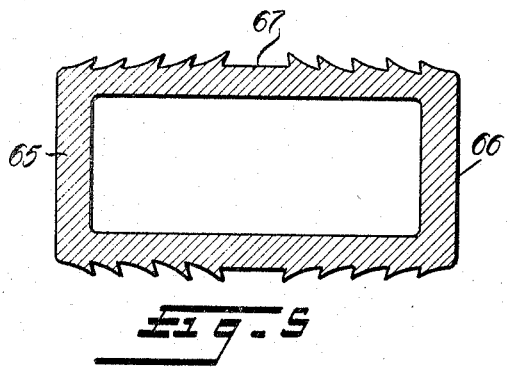

The tubular fastener shown in FIGURE 5 (shown in transverse action) is similar to that shown in FIGURE 1 in that its teeth have leading faces which are concave or hollow-ground. But whereas the locus of points corresponding to the biting edges of the teeth on one side of the spline fastener of FIGURE 1 is substantially parallel to the locus of points corresponding to the biting edges of the teeth on the opposite side of that fastener, the teeth of the fastener of FIGURE 5 taper outwardly in a direction from each of ends 65 and 66 of the section toward its central portion 67, resulting in a spline fastener whose central portion is thicker than its end portions. Since the teeth in the central portion of a given spline fastener must provide gripping action in a surface which has been scraped by the teeth in the end regions of the spline fastener during its insertion into the slot provided in the structural member, the taper as above described tends to increase the biting strength of the centrally located teeth to compensate for this fact.

Variations of the basic spline fasteners shown in FIGURES 1–5, some of which have substantial functions other than the fastening together of two structural units, are shown in FIGURES 6–10. For example, in the trim-type spline section shown in FIGURE 6, only one portion 68 of each side 69 is provided with teeth, the other side 71 being substantially planar for exposure as trim, for various purposes to be hereinafter set forth. In other respects, however, the trim-type spline element is used similarly to that described above in connection with the section shown in FIGURE 1, the toothed portion of the spline section being inserted in a slot suitably provided in a structural element to which the trim-type spline is to be attached (see FIGURE 11). Other modifications of spline fastening devices are shown in FIGURES 7–10, details of which will be discussed in a later portion of this specification.

Figure 6:
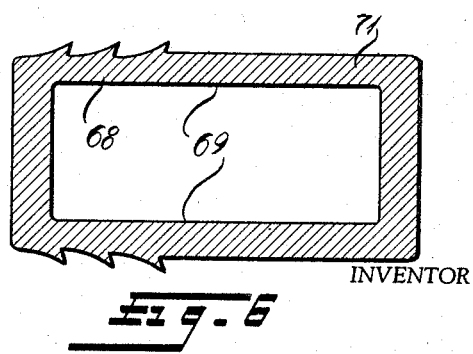

In FIGURE 11, a trim-type spline section as shown in FIGURE 6 is shown in use as trim for a door. A post 70 or other suitable support is provided on a side 71 with a longitudinal slot 72 having parallel side walls 74 and being substantially co-extensive with the length of the post. Substantially co-extensive with slot 72 and firmly secured therein by means of its teeth projecting into the wood of side walls 74 is a trim-type spline section 76 of the type shown in FIGURE 6, the planar portion 78 of the section projecting laterally out of the slot. Spline section 76 is inserted into slot 72 in a manner identical to that described above.

As clearly shown in FIGURE 11, a door 80 is situated in its closed position with its free end in abutting relationship with the exposed planar portion 78, the free vertical edge 82 of the door being in sealing contact with a spring element 84 which is rigidly fastened to post 70. Since spline section 76 may be force-fitted into slot 72 by means of a rubber mallet or the like, the planar portion 78 of the section may be completely prefinished prior to its insertion in the slot without any danger of marring the finish during installation.

Also shown in FIGURE 11 is a novel spline fastener of the instant invention in use as a support for a windowpane. Side 88 of post 70 is provided with a longitudinal slot 90 having parallel side walls 92 and being substantially co-extensive with the length of the post. Force-fitted into slot 90 in the manner described previously above is a spline fastener 94 of the type shown in FIGURE 1 and whose length is slightly greater than the length of the edge of the windowpane which is bounded by the laterally projecting portion 96 of the spline fastener.

A window trim section 98, of the same length as spline fastener 94 and having a U-shaped cap 100, is positioned adjacent side 88 of post 70 with its cap 100 force-fitted over the projecting portion 96 of spline fastener 94. As clearly shown, ratchets 102 at the base of cap member 100 extend beyond the edges of the lowermost teeth 104 on projecting portion 96 and fix cap 100 and trim section 98 securely in place with respect to side 88 of post 70 and spline fastener 94.

Positioned adjacent the shoulder formed by the intersection of cap 100 with the remainder of trim section 98 is a resilient gasket 106 against which insulating-type windowpane 108 is positioned. A spring clip 110 is inserted into the opening bounded by the edge 112 of the windowpane, gasket 106 and trim section 98, a short leg 114 of the spring clip extending around the edge of the windowpane and a long arm 116 of the spring clip extending into a hooked edge 118 of trim section 98, thus securing one edge of windowpane 108 in position as shown in FIGURE 11. Caulking material 120 is inserted in the gap between short and long arms 114 and 116, respectively, to suitably seal the support surface.

Though the structure shown in FIGURE 11 and described immediately above is the jamb section of a window frame, the other jamb section and the head and sill sections of the frame may be similarly constructed, thus providing an effective frame bounding the windowpane and securing it firmly in place. Where it is impractical to slot the wooden support member to insert a spline fastener of the type shown in FIGURE 1, a fastener of the type shown in FIGURE 9, which is suitably provided with screw holes along its length, may be screwed into place to serve as the projecting portion of the spline fastener.

In FIGURE 12, the novel spline fasteners of the instant invention are shown in use to secure a threshold member in place. Secured to the edge of a floor panel 122 by means of screws or screw nails 124 passing through a hole suitably provided in its fin 126 is a spline fastener 128 of the type shown in FIGURE 7. As so secured, the toothed portion 130 of the spline fastener projects above and partly rests upon floor panel 122. The other portion of the toothed portion 130 rests upon the elbow 132 of a sill-box spline section 133 to be described in greater detail below.

A threshold frame 134, which may be of aluminum or like material, is provided with a longitudinally slotted portion 136 on its underside, the walls 138 of the slot being separated by a distance slightly greater than the distance between the corresponding teeth of opposite sides 140 and 142 of toothed portion 130. Threshold frame 134 is secured relative to the upwardly toothed portion 130 by forcing it down about the said portion so that the ratchets 144 in the slots are in locking engagement with the lowermost of the teeth on toothed portion 130. A resilient gasket 146, which is suitably secured in the upper face of threshold 134, serves to sealingly engage a door 148 in its closed position.

Still another use of the novel spline fasteners of the instant invention is shown in FIGURE 13. As there shown, a filler spline fastener 150 of the type shown in FIGURE 9 is shown force-fitted into a slotted structural member 152. A rain gutter 154 having an L-shaped securing portion 156, is rigidly secured to said structural member by means of spline fastener 150, leg 158 of the L-shaped portion being adjacent side wall 160 of the slot, leg 162 being positioned adjacent the base of the slot. A downspout 163, shown partly in section, is secured as by welding to rain gutter 154.

FIGURE 13 also shows the use of a spline fastener of the type shown in FIGURE 8, the fin 164 of said spline fastener extending into a suitably provided slot or kerf 166 suitably provided in a structural member 168. Since fin 164 is not provided with teeth and is not otherwise secured to structural member 168, this connection will secure structural members 168 and 170 against movement relative to one another only in a direction normal to the plane of the fin.

As aforesaid, each of the spline fasteners of the instant invention is provided with a hollow central portion, in the form of a longitudinal bore, as can clearly be seen in FIGURES 1–10. This provision gives the spline fastener one of its most significant advantages, in that it provides a continuous raceway through which wires can be pulled throughout a building with a minimum of difficulty. This results not only in substantial economies due to a significant reduction in the labor and time required for the installation of the wiring but, as well, in a reduction in damage to the structural materials due to the elimination of the cutting of structural parts normally required for wiring installation. Furthermore, the spline fastener serves as a conduit for the electrical wiring, greatly reducing fire hazard in the structure in which the spline fasteners are used.

Figure 12A:
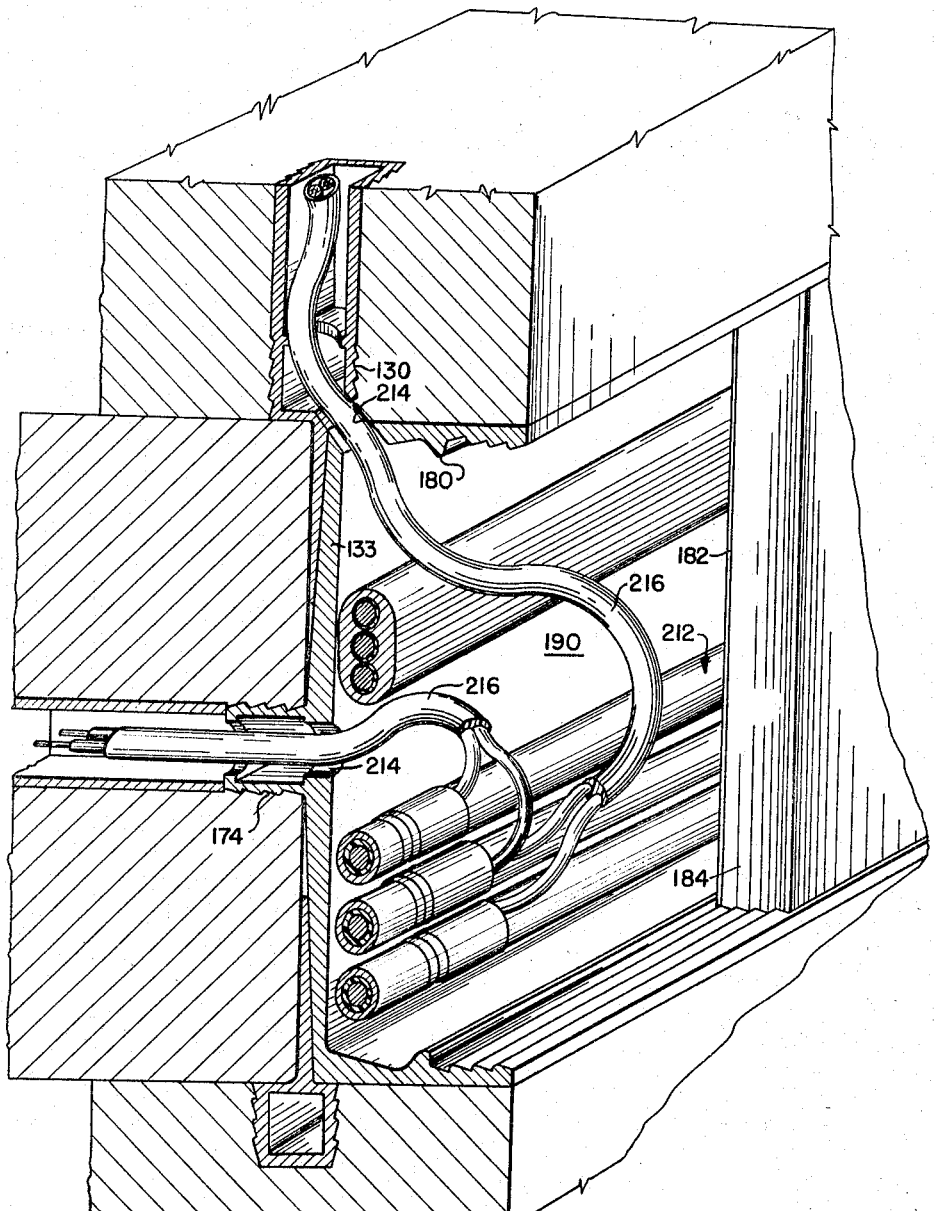
FIGURE 12A is an elevation in partial section similar to FIGURE 12 but showing the use of the spline connector as a conduit for carrying the electrical wiring.

To obtain maximum advantage from the use of the spline fasteners as conduits for electrical wiring, however, the spline fasteners should be used in conjunction with a sill-box spline fastener of the type shown in FIGURES 10, 12 and 12A. As shown in detail in FIGURE 10, the sill-box spline fastener comprises a Y-shaped elongated section 172 whose trunk 174 is a toothed fastening section of the type described above in connection with the other spline fasteners. The upwardly extending branches 176 and 178 of the section are provided with shoulders 180 for supporting a continuous sealing gasket 182 and a removable access panel 184. The inner edges 186 of the outer extremities of the branches are toothed sufficiently to secure access panel 184 in the sill-box but to allow its removal with a minimum of effort. As is the case with each of the spline fasteners of the instant invention, the sill-box channel is elongated, the view shown in FIGURE 10 being a sectional view taken transversely therethrough.

In FIGURE 12, the sill-box spline fasteners is shown securely positioned with its trunk 174 locked in a slot 188 provided in floor panel 122, the sill-box being force-fitted into the slot in the manner aforedescribed in connection with the other spline fasteners. In the preferred embodiment, a perimeter of sill-boxes is formed around an entire building and used to carry trunk power lines safely and economically in its central void portion 190. With such a construction, the sill-box is situated below headers 212 (see FIGURE 12A) which are predrilled with a suitable number of holes having walls 214 throughout their length and positioned so that the holes align with the longitudinal bores in the spline fasteners so that wiring may be passed through the spline fastener bores into the headers as shown in FIGURE 12A. The main electrical lines 212 are carried in central void 190 and the individual wiring 216 is fed through holes having walls 214 which may be drilled into the header. Wires 216 may then be drawn up from the sill-box through the spline fastener bores and into the headers to provide wiring where needed throughout the structure. Wires 216 may also be drawn in a similar manner from the sill-box (see FIGURE 12A) through the bores of spline fasteners 174 radiating in horizontal directions therefrom.

After the structure has been completed, wiring can be added by removing the sill-box access panel, making a suitable connection with the trunk power lines, and drilling into a spline fastener or structural member to take the wire where it is needed. Electrical switches and outlets may be installed by drilling through the wall into a spline fastener and securing the connection box to the wall in front of the spline. If desired, of course, additional sill-box spline fasteners may be provided, preferably one for each floor of the structure. The foregoing structure makes possible a truly effective trunk distributing system.

As aforesaid, the air conditioning requirements of prior art construction systems and methods often required the use of circuitous and involved duct work involving extensive cutting of framing and hand-fitting of sheet metal, usually at great cost. One of the important features of the instant invention, made possible by the use of my novel spline fasteners, is the partial elimination of such prior art conventional heating system components by utilizing the interior space between the outer wall member of each panel as a conditioned air passageway to serve as ducting which would otherwise require extra wall space and departure from the sole use of the novel panel construction of the present invention to provide increased wall or floor thickness to hide the duct work.

A room or other enclosure to be air conditioned is provided with wall and floor panels of the type shown in FIGURES 14 and 15. Such a panel comprises two spaced sheets 194 and 195 sealed at their sides by vertical strips 196, each of which has a longitudinal slot 198 substantially co-extensive therewith. The top edge of each panel which is to be used as a wall panel is sealed by a horizontal strip (not shown), thus forming a hollow central portion 200 having an open bottom 201; for use as a floor panel, both top and bottom edges are sealed in this manner. Provided near the top of sheet 194 is an opening having a series of staggered louvres 202 therein. The enclosure is formed with panels of the type described, the panels being fastened together either directly or to intermediate slotted structural elements by means of spline fasteners in the manner heretofore described. The floor panel will be positioned with its louvres facing upwardly into the enclosure, communication between a source of temperature-conditioned air and the floor panel being established by cutting an opening to provide a suitable inlet (not shown) in the spaced sheet 195 of the floor panel.

In use, temperature-conditioned air, i.e., either hot or cool, is forced by a suitable blower 203 into the inlet in the floor panel, out of the louvres in said panel, and into the enclosure. Air is exhausted from the enclosure through louvres 202 of the wall panels, through the hollow central portion 200 thereof, out through its bottom opening and into a conduit leading back to the blower inlet for recycling to the air conditioning unit.

The foregoing system is most efficient for the heating of an enclosure, since the heated air is best introduced at floor level. For cooling purposes, however, the flow of air may be reversed if desired (i.e., into the wall panels, out through louvres 202, into the enclosure, through the louvres in the floor panel, and back to the inlet of the blower) to establish introduction of the cool air at the upper wall level. If desired, the hollow interiors of the ceiling panels may also be integrated into the conditioning system.

To protect the panel from the effects of the air forced into the panel, the inner surfaces of the panel are factory coated with a protective material 204. An aluminum spray coating is especially effective for this purpose. Such coating also serves as an insulation barrier to impede the flow of radiant energy into or out of the enclosure bounded by the panel. As shown in FIGURE 14, additional conventional mat insulation 206 may be provided in the panel if desired.

Panel 192 is preferably made of glued plywood skin-stressed sheets, though other materials may be satisfactorily employed.

The air conditioning structure described above not only obviates the need for the installation of circuitous and involved duct work and the extensive cutting of framing and hand-fitting of sheet metal as aforestated, but additionally serves to make the wall, floor and ceiling panels themselves serve as effective heat transfer surfaces. Furthermore, since the panels may be easily installed to means of my spline fasteners, the prefabricated panels may be factory coated and sealed, substantially reducing construction costs.

Figure 17:
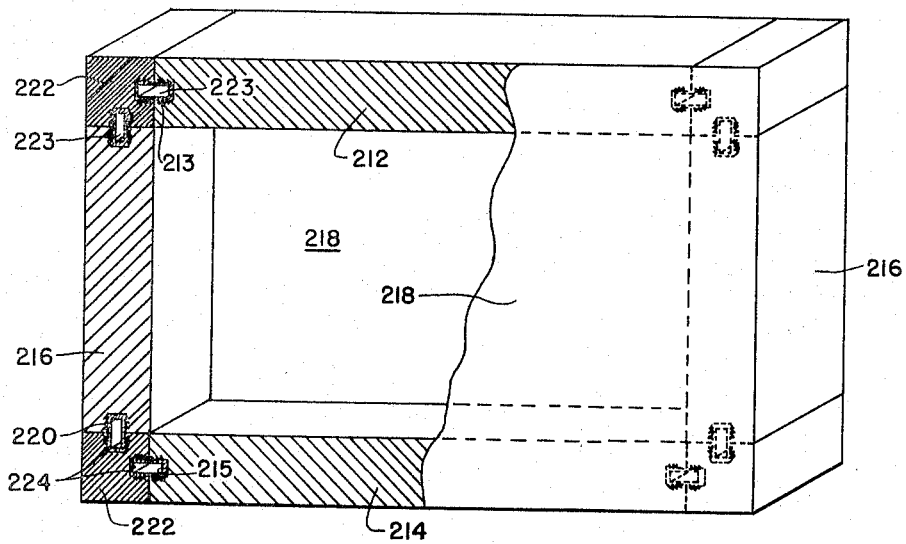
FIGURE 17 is a partially sectioned front elevation of a paneled enclosure utilizing the novel spline fasteners of the present invention.

A representative illustration of the four-walled enclosure discussed above having top and bottom horizontal panels such as ceiling 212 and floor 214, vertical side wall panels 216 and vertical front and rear wall panels 218 with all panels being connected in identical manner is shown in FIGURE 17. Ceiling 212, floor 214 and the four vertical wall panels are provided with elongated spline-receiving slots 213, 215 and 220 respectively, in their end edges substantially coextensive with the respective panel edge. Intermediate horizontally extending structural members 222 having elongated slots 224 in adjacent intersecting surfaces may be disposed intermediate the horizontal and vertical panels for receiving elongated spline fasteners 223 to fasten ceiling 212 and floor 214 in position. The vertical panels may be secured in position by means of elongated spline fasteners in vertical intermediate structural members as shown in FIGURE 11.

Figure 18:
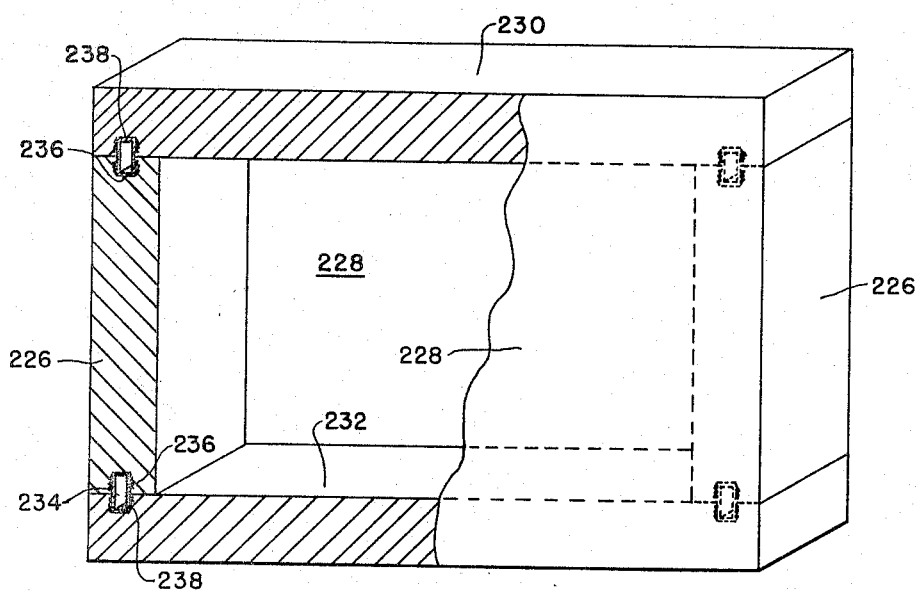
FIGURE 18 is a partially sectioned front elevation of another paneled enclosure utilizing the novel spline fasteners of the present invention.

FIGURE 18 illustrates an enclosure having vertical side wall panels 226, front and rear wall panels 228, a top ceiling panel 230 and a bottom floor panel 232. In this embodiment, the ceiling and floor panels are joined directly to the vertical wall panels by means of elongated spline connectors 234. Side wall panels 226 are provided with elongated spline receiving slots 236 in their end edges. Ceiling panel 230 and floor panel 232 are provided with similar elongated spline receiving slots 238 near their end edges in their bottom and top surfaces respectively. This arrangement obviates the need for intermediate structural members 224 shown in FIGURE 17.

Numerous other uses may be found for the novel spline fasteners of the instant invention. For example, prefabricated storage units (i.e., closets, shelves and the like on one wall) may be easily installed between two supports by means of the spline fasteners.

The advantages and remarkable savings which can be effected using my novel spline fastener construction and associated structural units are evident from the foregoing description. The use of such fastening elements promises to open up a completely new field of construction and provide substantial opportunities for the construction of low-cost buildings or other structures. All structural units may be prefabricated and prefinished and assembly is so completely simplified as to permit much of the work to be done by the owner himself.

The invention may be embodied in other specific forms without departing from the spirit or essential characteristics thereof. The structural elements, which preferably are of aluminum and fir, may advantageously be made of other materials. For example, wooden posts or edge members of the plywood panels may be coated with a plastic covering or be made of laminated layers to reduce warping and splitting. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a building, a joint construction comprising at least two structural members such as posts, panels or beams where at least one of said members is a panel that is secured together with the other member in abutting relationship, there being opposed slots in the abutting surfaces of said structural members and extending substantially the length of and opening onto said surfaces; a hollow rigid coupling member for both positioning and holding said members together, said coupling member having a length several times as great as any of its lateral dimensions and two opposed sides, each of said sides being divided into two parallel surface portions on either side of a plane passing through said member substantially perpendicularly to said sides; each of said surface portions having projections with biting edges, leading faces sloping gradually upward in a direction towards said plane, and trailing faces forming acute angles with said leading faces; the portion of said coupling member on one side of said plane being substantially completely within the slot formed in the abutting surface of one of said structural members and the portion of said coupling member on the other side of said plane being substantially completely within the slot formed in the abutting surface of the other of said structural member, and the biting edges of said projections on both sides of said coupling member extending into and firmly gripping the side walls of said slots in said structural members.

2. The joint construction as defined in claim 1 wherein said panel is made of two laterally spaced panel members joined together at their edges to marginal edge frame members; two of said edge frame members being longitundinally slotted to receive coupling members defined in claim 1; a layer of protective material in intimate contact with inner facing surfaces of said panels, and an air inlet and an air outlet in said wall sections whereby the space between said inner facing surfaces serves as an air conduit.

3. The joint construction as defined in claim 1 wherein electrical conductors extend through said hollow connector member whereby said connector members serve as a conduit for distribution of electrical power through a building.

4. The joint construction as defined in claim 3 further including a horizontally extending floor panel supporting said wall panel and having a horizontally extending slot therein; a sill-box member having a rigid connector portion within said slot to secure said sill-box member to said floor panel; and electrical conductor means disposed in said still-box member and connected to the conductor means in the hollow coupling member joining said wall panels.

5. The joint construction as defined in claim 4 wherein said sill-box member includes a readily detachable cover member to provide access to said conductors in said sill-box member.

6. The joint construction as defined in claim 1 wherein said two structural members are part of a vertical wall in a building and are joined to a horizontal structural portion such as a floor or ceiling, of said building; said horizontal structural portion having a longitudinal slot at a location abutting a marginal edge of at least one said two structural members; said one of said structural members having a further longitudinal slot facing and aligned with the longitudinal slot in said horizontal portion; and another of said coupling members extending into each of said facing longitudinal slots for securing said vertical wall and said horizontal structural portion together.

7. The joint construction as defined in claim 1 wherein said two structural members are part of a vertical wall in a building and are joined to a horizontal floor portion at the bottom and to a horizontal ceiling structure at the top; said floor and ceiling portions each having a longitudinal slot abutting a marginal edge of at least one of said two structural members; said one of said two structural members having two additional longitudinal slots, one facing and aligned with the floor portion and the other facing and aligned with the ceiling portion; and additional ones of said coupling members extending into each of said facing longitundinal slots for securing said vertical wall with said floor and ceiling portions.

8. The joint construction as defined in claim 1 wherein an enclosure defining wall made of at least four substantially vertical wall sections composed of at least one panel each are disposed in the form of a closed polygon and joined to a floor section; the wall sections each contain one or more of said structural members each having aligned longitudinal slots in their abutting edge surfaces at the corners of said polygon; the adjacent structural members being secured together by separate ones of said rigid coupling means disposed in said aligned slots; and there being aligned slots in the floor section and a plurality of panels forming the enclosure defining wall for joining the enclosure defining wall and floor section together.

9. The structure as defined in claim 8 wherein electrical conductors extend through said hollow connector members whereby serve as a conduit for distribution of electrical power through a building.

10. The joint construction as defined in claim 9 further having a sill-box member having a rigid connector portion within said slot to secure said sill-box member to said floor section; and electrical conductor means disposed in said sill-box member and connected to the conductor means in the hollow coupling member joining said wall panels.

11. A wall construction comprising: a pair of prefabricated wall panels disposed in edge-to-edge abutting relationship and having longitudinal slots in and extending substantially the length of said panels including at least one elongated hollow metal fastener having side wall portions disposed in the slots in said panels to locate said panels in aligned relationship; a horizontally extending floor support member supporting said wall panels having a horizontally extending slot therein; a sill-box member having a spline connector portion within said floor support member slot securing said sill-box member to said floor support member; electrical conductor means disposed in said hollow fastener and in said sill-box member; and a separate cover member on said sill-box member which provides access to said conductors in said sill-box member.

No references cited.

LEWIS H. MYERS, *Primary Examiner.*

H. W. COLLINS, *Assistant Examiner.*